United States Patent
Meuleman et al.

(10) Patent No.: US 9,283,522 B2
(45) Date of Patent: Mar. 15, 2016

(54) PROCESS FOR SEPARATING LIQUID MIXTURES

(75) Inventors: Erik Everhardus Bernardus Meuleman, Zutphen (NL); Peter Geerdink, Leiden (NL); Earl Lawrence Vincent Goetheer, Westdorpe (NL); Eva Sanchez Fernandez, Leiden (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 311 days.

(21) Appl. No.: 13/056,760

(22) PCT Filed: Aug. 19, 2009

(86) PCT No.: PCT/NL2009/050501
§ 371 (c)(1),
(2), (4) Date: Mar. 31, 2011

(87) PCT Pub. No.: WO2010/021545
PCT Pub. Date: Feb. 25, 2010

(65) Prior Publication Data
US 2011/0266219 A1 Nov. 3, 2011

(30) Foreign Application Priority Data
Aug. 19, 2008 (EP) .................................... 08162585

(51) Int. Cl.
*B01D 61/36* (2006.01)
*B01D 63/02* (2006.01)
(Continued)

(52) U.S. Cl.
CPC .............. *B01D 61/362* (2013.01); *B01D 63/02* (2013.01); *B01D 63/082* (2013.01); *B01D 61/364* (2013.01); *B01D 2313/22* (2013.01); *C02F 1/447* (2013.01); *C02F 1/448* (2013.01)

(58) Field of Classification Search
CPC .... B01D 61/36; B01D 61/362; B01D 61/364; B01D 61/366; B01D 61/368; B01D 2311/04; B01D 2311/10; B01D 2311/103; B01D 2311/2669; B01D 2325/027; B01D 2313/22; B01D 5/0003; B01D 5/0009; B01D 5/0012; B01D 5/0015; B01D 5/0057; B01D 5/006; C02F 1/447; C02F 1/448
USPC ......... 210/640, 641, 321.79, 321.8, 773, 774, 210/500.23
See application file for complete search history.

(56) References Cited

U.S. PATENT DOCUMENTS

| 4,391,676 A | 7/1983 | Torberger |
| 4,746,437 A * | 5/1988 | Koseki et al. ................. 210/640 |

(Continued)

FOREIGN PATENT DOCUMENTS

| EP | 0039197 | 11/1981 |
| EP | 0894524 | 2/1999 |

(Continued)

OTHER PUBLICATIONS

International Search Report issued in PCT/NL2009/050501 and dated Nov. 23, 2009.

*Primary Examiner* — David C Mellon
*Assistant Examiner* — Pranav Patel
(74) *Attorney, Agent, or Firm* — Lucas & Mercanti, LLP

(57) ABSTRACT

The invention is directed to a process for separating liquid mixtures, which includes passing a liquid stream of the liquid mixture over a membrane, the membrane being selective for at least one of a first compound and a second compound, whereby at least part of the liquid stream passes through the membrane leaving the other side of the membrane as a vapor, with the remainder of the liquid stream forming a retentate stream, and condensing the vapor on a condenser surface having a lower temperature than the liquid stream to give a distillate stream, the condenser surface forming a non-permeable heat conducting separation wall between the distillate stream and a cooling stream which cooling stream is a) a feed stream, or b) the retentate stream.

27 Claims, 2 Drawing Sheets

(51) Int. Cl.
*B01D 63/08* (2006.01)
*C02F 1/44* (2006.01)

(56) References Cited

U.S. PATENT DOCUMENTS

| | | | |
|---|---|---|---|
| 4,818,345 A | | 4/1989 | Joensson |
| 4,944,882 A | * | 7/1990 | Ray et al. .................... 210/640 |
| 5,464,540 A | * | 11/1995 | Friesen et al. ............... 210/640 |
| 6,716,355 B1 | * | 4/2004 | Hanemaaijer et al. ....... 210/640 |
| 6,899,743 B2 | * | 5/2005 | Wijmans et al. ............... 95/50 |
| 2006/0076294 A1 | * | 4/2006 | Sirkar et al. .................. 210/640 |
| 2007/0031954 A1 | * | 2/2007 | Mairal et al. .................. 435/161 |
| 2008/0099400 A1 | * | 5/2008 | Nemser et al. ............... 210/638 |
| 2008/0131948 A1 | * | 6/2008 | Manzer et al. ................ 435/167 |
| 2008/0216649 A1 | * | 9/2008 | Huang et al. .................... 95/50 |

FOREIGN PATENT DOCUMENTS

| | | |
|---|---|---|
| EP | 1762295 | 3/2007 |
| GB | 2151155 | 7/1985 |
| JP | 63137705 A | 6/1988 |

* cited by examiner non-woven  woven

PROCESS FOR SEPARATING LIQUID MIXTURES

CROSS-REFERENCE TO RELATED APPLICATIONS

This application claims the benefit of European Patent Application No. 08162585.7 filed Aug. 19, 2008 and International Application No. PCT/NL2009/050501 filed Aug. 19, 2009, the contents of each of which are incorporated herein by reference.

FIELD OF THE INVENTION

The invention is directed to a process for separating liquid mixtures, an apparatus for separating liquid mixtures.

BACKGROUND OF THE INVENTION

It is known from the art that liquid mixtures can be separated by pervaporation. Pervaporation is a separation process in which a membrane in contact with a feed stream of a liquid mixture selectively absorbs one or more of the species from the feed stream. The sorbed species permeate across the membrane under the influence of a vapour pressure gradient that is produced by removing the permeate from the product side of the membrane using a vacuum or sweep gas. Industrially, vacuum is economically produced by condensing the permeate stream. This spontaneously generates a partial vacuum that drives the process. In all cases, permeate vapor is eventually condensed and the resulting distillate stream recovered as a liquid. An advantage of pervaporation over distillation is that, because of the selectivity of the membrane, pervaporation can separate azeotropic mixtures beyond the azeotropic ratio.

WO-A-2008/054 207 describes a method for the purification of a liquid by direct contact membrane distillation, in particular for the production of desalinated water from seawater or brackish water. The method comprises passing a heated vaporizing stream of a liquid over a porous membrane. The porous membrane is hydrophobic and the pores are filled with air. Thus, liquid water is unable to pass through the hydrophobic membrane, while water vapor and other gas molecules can pass through the membrane. Vapor of the liquid flows through the membrane and is condensed on the other side at a condenser surface, which surface forms a non-porous separation between a feed stream of the liquid to be purified and the (condensed) vapor. The method described in WO-A-2008/054 207 is energy efficient in that both the costs and the energy consumption of the membrane distillation system are low.

Disadvantage of this method is that this process cannot be used for separating liquid mixtures comprising hydrophobic liquids and hydrophilic liquids. When a hydrophobic/hydrophilic mixture would be applied according to the method described in WO-A-2008/054207, pore wetting would occur which may result in the membrane becoming impermeable or leakage. Liquid mixtures may in principle be separated using the method described in WO-A-2008/054207, but only with limited efficiency because the membrane is not selective. Passing the azeotrope of a mixture is impossible using this method.

SUMMARY OF THE INVENTION

Object of the invention is to at least partly overcome the above-mentioned disadvantages and to provide a process for separating liquid mixtures, which process requires a minimum amount of energy to work.

The inventors found that this object can be met by making use of a pervaporation process, in which the permeate vapor is condensed on a non-permeable heat-conducting condenser surface, which surface is in heat-exchanging contact with either a) the feed stream, in case the feed stream has a sufficiently low temperature to serve as a suitable cooling medium for the condensation of the permeate vapor, or b) the retentate stream, in case the feed stream has such a high temperature that would make it unsuitable as a cooling medium for the condensation of the permeate vapor.

The invention thus optimizes the internal recovery of heat, resulting in a minimum amount of heat loss. Furthermore, the temperature difference between the cooled distillate stream and the vaporizing stream results in a difference in vapor pressure, which contributes to the driving force behind the separation, reducing the energy consumption of the process. Thus, the present invention provides for a pervaporation process which does not need a vacuum or a sweep gas for separation to occur.

DETAILED DESCRIPTION OF THE INVENTION

In a first aspect, the present invention is directed to a process for separating a feed stream of a liquid mixture comprising at least a first compound and a second compound, comprising:

passing a liquid stream of the liquid mixture over a permeable non-porous selective membrane, said membrane being selective for at least one of said first and second compound, whereby at least part of the liquid stream passes through said membrane leaving the other side of said membrane as a vapor, with the remainder of the liquid stream forming a retentate stream, and condensing said vapor on a condenser surface having a lower temperature than the liquid stream to give a distillate stream, said condenser surface forming a non-permeable heat conducting separation wall between said distillate stream and a cooling stream, which cooling stream is either a) said feed stream, in case the feed stream has a sufficiently low temperature to serve as a suitable cooling medium for the condensation of the permeate vapor, or b) said retentate stream, in case the feed stream has such a high temperature that would make it unsuitable as a cooling medium for the condensation of the permeate vapor, so that heat can be transferred between the vapor and the cooling stream, wherein the distance between said membrane and said condenser surface is smaller than 10 mm, and wherein the vapor pressure of said distillate stream is lower than the vapor pressure of the compounds in the liquid stream for which the permeable non-porous selective membrane is selective, resulting in sufficient driving force for the separation to occur.

A heat exchanger may be used in the present invention to increase the temperature difference between the vaporizing stream and the cooling stream. Said heat exchanger is preferably placed between the liquid stream to be vaporized (vaporizing stream) and the cooling stream. The heat exchanger can either function as a heating source or as a cooling source, whichever function is needed to increase said temperature difference.

Figure 1A:
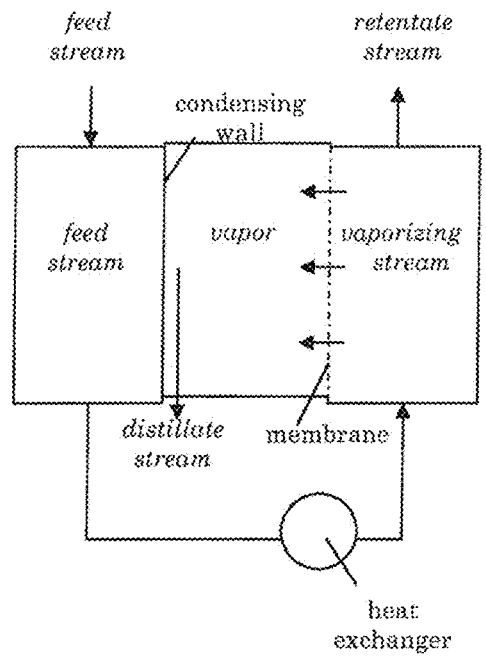
FIGS. 1a and 1b are schematic flow diagrams of processes in accordance with the claimed invention.

FIG. 1a shows a schematic representation of one embodiment of the process according to the present invention, in which the condenser surface forms a non-permeable heat conducting separation wall between the distillate stream and the feed stream. A feed stream of a liquid mixture is first heated via heat-exchanging contact with the condensing vapor. An external heat exchanger is then used for additional heating of said feed stream. The thus obtained liquid stream to be vaporized is led over a permeable non-porous selective membrane, whereby at least part of the liquid passes through said membrane leaving the other side of said membrane as a vapor, with the remainder of the liquid forming a retentate stream.

Figure 1B:
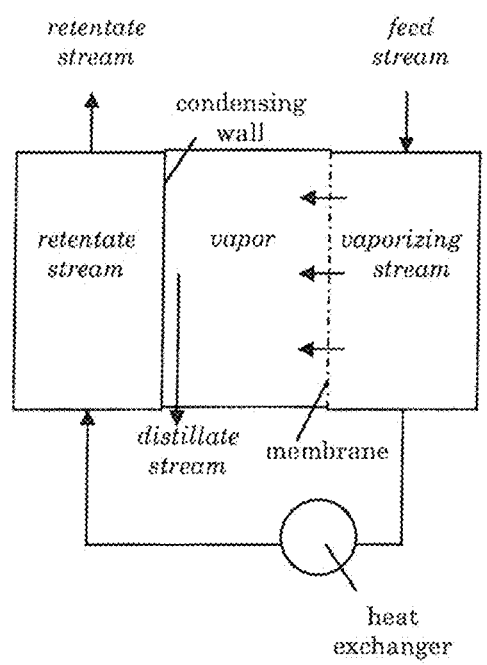

FIG. 1b shows schematic representation of an embodiment of the process according to the present invention, in which the condenser surface forms a non-permeable heat conducting separation wall between the distillate stream and the retentate stream. A liquid stream of a liquid mixture is led over a permeable non-porous selective membrane, whereby at least part of the liquid passes through said membrane leaving the other side of said membrane as a vapor, with the remainder of the liquid forming a retentate stream. Said retentate stream is subsequently cooled using a heat exchanger and is then brought into contact with the non-permeable heat conducting separation wall, functioning as a cooling medium for the condenser surface.

The difference in vapor pressure between the distillate stream and the liquid stream is the main driving force behind the separation in the process according to the present invention. Said difference in vapor pressure is preferably larger than 15 kPa, more preferably larger than 25 kPa, most preferably larger than 50 kPa. For example, when ethanol is removed from water using the method according to the present invention, the vapor pressure difference is preferably at least 15 kPa. When removing water from an organic stream, the difference in vapor pressure is preferably at least 20 kPa. The value of the vapor pressure is i.a. dependent on the membrane used and the composition of the mixture to be separated. Suitably a relatively large difference in vapor pressure is applied in the case of a highly selective membrane, preferably larger than 50 kPa, to create a significant flux through the membrane. The flux as used herein is defined is the rate with which the distillate is obtained per unit membrane surface area. Usually, the difference in vapor pressure is preferably smaller than 200 kPa, more preferably smaller than 100 kPa. The amount of heat transported over the membrane (and therewith the efficiency of the process of the invention) is strongly dependent on the flux (or mass transport). In addition, it is dependent on the enthalpy of condensation of the permeate, which for instance is high for water, but significantly lower for organic solvents (about 2-4 times lower than the enthalpy of condensation of water). Accordingly, in an advantageous embodiment the flux is 0.5 $kgm^{-2}h^{-1}$ or more, preferably 1 $kgm^{-2}h^{-1}$ or more. Normally, the flux will not exceed a value of 5 $kgm^{-2}h^{-1}$. The enthalpy of condensation of the permeate is preferably 1500 $kJkg^{-1}$ or higher, more preferably 2100 $kJkg^{-1}$ or higher. Normally, the enthalpy of condensation will not exceed a value of 2250 $kJkg^{-1}$.

The vapor pressure of a liquid is strongly dependent on the temperature of said liquid. In the present invention, the vapor pressure of the liquid stream is thus dependent on the temperature of said liquid stream and the vapor pressure of the distillate stream is dependent on the temperature of the distillate stream. The difference between these temperatures mainly determines the driving force of the separation.

Since the temperature, and thus the vapor pressure of the distillate stream is mainly determined by the temperature of the cooling stream, the main driving force behind the process of the present invention can be controlled by regulating the temperature difference between said vaporizing stream and said cooling stream. Since the temperature in the streams may not be uniform, temperature averages can be measured for each stream. The difference in temperature average between the vaporizing stream and the cooling stream is preferably larger than 5° C., more preferably larger than 10° C.

Furthermore, the difference in temperature average between the liquid stream and the cooling stream should not be too high, for large temperature differences may result in energy loss, thus making the pervaporation less energy sufficient. The difference in temperature average between the liquid stream and the cooling stream is therefore preferably smaller than 30° C., more preferably smaller than 20° C.

The distance between the permeable non-porous selective membrane and the condensing surface should preferably be small, to minimize energy loss that occurs when the permeate vapor would be transported over a large distance. However, the distance should not be too small to prevent capillary action between the membrane and the condensing surface. Preferably, the distance between the permeable non-porous selective membrane and the condensing surface is larger than 1 mm, more preferably larger than 2 mm. Furthermore, the distance between the permeable non-porous selective membrane and the condensing surface is smaller than 10 mm, preferably smaller than 4 mm.

Figure 2:
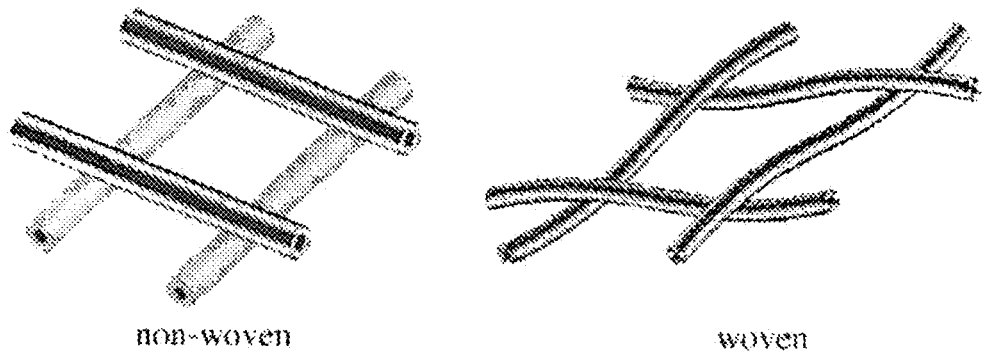
FIG. 2 illustrates spacer filament materials used in the present invention.

The space between the membrane and the condenser surface may be filled with so called spacer materials, consisting of nettings, technical fabrics and the like, made of woven or non woven filaments in various shapes (see FIG. 2), of polymers like polypropylene (PP), polyethylene (PE), ethylene-vinyl acetate (EVA), etc. Suitable shapes include symmetrical squares, rectangles, diamonds, waves, etc.; also, asymmetrical shapes and filaments can be used.

The spacer works by forcing the liquid up and down while it flows along. This creates turbulence, which helps to keep the concentration and temperature as uniform as possible in the channels. It also prevents the membrane and condenser sheet to touch each other or move further apart.

When using a non-porous membrane according to the method of the present invention, a liquid layer may form on the membrane surface on the side of the liquid stream. This layer is called the depletion layer. Molecules evaporating from the depletion layer through the membrane will result in cooling of the depletion layer. The thickness of the depletion layer thus has a negative effect on the mass transfer. Mass transfer is defined as the transport of single components in the evaporated liquid stream through the membrane (as opposed to the flux which relates to the total of components) and can be expressed by the amount of distillate obtained (in kg) per unit membrane surface (in $m^{-2}$) over time (e.g. per hour, in $h^{-1}$).

The heat that is required to partially evaporate the feed is supplied by the bulk solution in the liquid stream. The total resistance to heat transfer comprises the membrane resistance and the depletion layer formed on the membrane surface. The temperature on the membrane surface decreases until an equilibrium is reached where the heat flux from the bulk in the liquid stream to the depletion layer equals the heat transported through the membrane to the distillate stream plus the heat required for evaporation of the depletion layer. Decreasing the thickness of depletion layer results in higher temperature on the membrane surface and therefore in higher fluxes of heat and mass.

Double-layers of said spacer materials are preferred to increase the mass transfer. The double-layered spacer forces the distillate stream to flow in a weaving motion, creating turbulence in the space between the membrane and the condenser surface that increases mixing and therefore increases the amount of heat transported to the depletion layer. This decreases the depletion layer that forms on the membrane surface and subsequently inhibits cooling of the liquid due to evaporation in the layer in touch with the membrane.

A sweep gas may be applied in the space between the membrane and the condenser surface. The presence of the sweep gas results in a lower partial vapor pressure of the distillate stream, which thus increases the driving force of the separation. Preferably, an inert gas is used as a sweep gas. Examples of sweep gases that can be used in the present invention are nitrogen, helium, air, carbon dioxide or argon.

Typically the feed is pumped into a feed channel leading to the selective membrane under a certain pressure. This pressure is called the hydrostatic pressure. Increasing the hydrostatic pressure enables operation at higher temperatures, because the boiling point of a substance increases when the pressure is increased. Operating at higher temperatures may be advantageous, because this increases the flux of the pervaporation process. Although the system can operate at low flux of distillate (i.e. low mass transfer), high flux is desired. As mentioned before, the flux is preferably $0.5$ $kgm^{-2}h^{-1}$ or more, more preferably $1$ $kgm^{-2}h^{-1}$ or more. In view of heat recovery, it is also of interest to have high flux of distillate. Nevertheless, applying a low hydrostatic pressure is in most cases preferred in view of energy conservation. Furthermore, a high pressure might increase the risk of damaging and/or compaction of the permeable non-porous selective membrane. Preferably, the hydrostatic pressure in the feed channel is 1 to 2 bar. The resulting pressure in the system may vary between 0.1 to 0.5 bar. Any pump that provides a stable flow and can overcome the system pressure drop can be used to apply the hydrostatic pressure, for example a gear pump or a centrifugal pump.

The condenser surface area is preferably 0.1-2 times the surface area of the permeable non-porous selective membrane. This can for instance be realized by providing condenser tubes within a hollow fiber non-porous selective membrane. Smaller values may result in a decrease of driving force. Larger values are not preferred, because of possible heat loss.

The feed stream has to be in heat-exchanging contact with the cooling stream. For this purpose, the feed stream may for example flow countercurrent, co-current or crosscurrent with respect to the cooling stream.

Part of the distillate stream may be recycled by leading at least part of the distillate stream back to the feed stream. In this way, the concentration of the compound(s) to be permeated will be increased in the feed stream, thus increasing the driving force and thereby decreasing the loss of product.

In an embodiment, the permeable non-porous selective membrane is chosen from polymeric membranes, ceramic (inorganic) membranes, supported liquid membranes, mixed matrix membranes or combinations of these materials. The materials that are used for these membranes can be for example polydimethylsiloxane (PDMS), polyvinyl acetate (PVA), perfluoro polymers or polyoctylmethylsiloxane (POMS) for polymeric membranes, silicate-1 for ceramic membranes, silicone rubber loaded with zeolite particles for mixed matrix membranes trioctylamine (TOA) in porous polypropylene (PP) for supported liquid membranes.

An important difference between the process of the invention and conventional processes (such as pervaporation and membrane distillation) is that when less selective membranes (with a relatively low separation factor) are used, hardly any efficiency penalty occurs in the proposed set up of the invention. The reason therefore is that the evaporation heat is immediately regained during condensation and accordingly transferred to the incoming feed stream. In pervaporation on the other hand, a highly selective membrane, a vacuum and refrigeration are used to ensure the highest possible selectivity in one step. Membrane distillation uses a porous membrane that has no selectivity at all for vapour and is only selective in the way that it lets vapour pass and liquids and/or solids not. Accordingly, the invention allows the use of much cheaper membranes than used in these conventional processes. In view of reducing investment costs for equipment, this is highly desirable. Although the separation factor per step will be lower, for many processes this is not decisive.

Hence in a preferred embodiment, the non-porous selective membrane has a separation factor of 40 or less, preferably 10 or less as measured by the vapour pressure on both sides of the membrane. Normally, the separation factor will be at least 2.

Permeable non-porous selective membranes are generally composed of three layers: a support layer, an ultra filtration membrane and a top layer. The selectivity of the membrane is mainly determined by the top layer. Regarding the process according to the present invention, said top layer may have a thickness of 0.1-100 μm, more preferably 0.1-10 μm, and most preferably 0.1-1 μm.

In a preferred embodiment, the liquid mixture according to the present invention comprises a hydrophilic first compound and a hydrophobic second compound.

In a preferred embodiment, the process according to the present invention can be used to separate liquid mixtures comprising water and an organic compound. Examples of organic compounds that may be used are aromatic hydrocarbons, alcohols (e.g. ethanol, butanol, ethylene glycol, glycerol), ketones (e.g. acetone), esters, cyclic ethers, halogenated hydrocarbons, organic acids (e.g. acetic acid), aliphatic amines (e.g. triethylamine), aromatic amines (e.g. pyridine), aprotic solvents (e.g. dimethyl formamide, dimethyl sulfoxide) and mineral acids (e.g. sulfuric acid).

In one embodiment, the liquid mixture according to the present invention is obtained from waste streams comprising organic compounds, for example waste streams from chemical industry plants.

In a preferred embodiment, the process according to the present invention is used to purify biofuels comprising for example ethanol, acetone and/or butanol. Biofuels can be obtained in fermentation processes from biomass. To recover biofuels from the liquid fermentation mixture, distillation techniques are generally used. Distillation processes can be economically and energetically efficient at large scales due to heat integration and economies of scale. However, distillation is energetically less favorable when the scale of operation is reduced or when the concentration of a compound is below 1 wt. %.

Fermentation broths for example often comprise low concentrations (about 1 wt. %) of butanol. Above this concentration, butanol becomes toxic to the bacteria that produce it, so it has to be removed from the broth in order to keep the fermentation going. This process can be performed using the method according to the present invention. Other separation techniques that could be applied are for example gas stripping, extraction, pertraction, vacuum stripping, or adsorption. A disadvantage of extraction and pertraction is the risk of broth contamination by toxic solvents, while adsorption techniques cost a lot of energy. The advantages of pervaporation over the other techniques are process simplicity, no toxicity and the reduction of further purification costs. The process of the invention further decreases the energy costs of pervaporation, thus making it particular suitable for the purification of biofuels, in particular for lowering of the concentration of butanol from fermentation broths.

The present invention may further be used for dewatering butanol and ethanol.

In an advantageous embodiment, heat required for process of the invention is derived from waste heat of another process, such as from the waste heat of industrial water. This further lowers the required energy for carrying out the process of the invention.

In a further aspect the invention is directed to an apparatus suitable for use in the method of the invention. The apparatus comprises one or more modules comprising a feed channel, a distillate channel and a retentate channel, whereby the segment has a first distribution chamber for feed liquid to be supplied, a second distribution chamber located opposite the first distribution chamber for feed liquid to be discharged, a third distribution chamber for liquid stream to be supplied, a fourth distribution chamber opposite the third distribution chamber for the liquid stream to be discharged and a fifth distribution chamber located at the bottom of the module to remove the permeate stream, whereby the segment is provided with a first pressure means for pumping the feed stream under pressure into the segment and a second pressure means which is arranged downstream the second distribution chamber for pumping the liquid stream under pressure into the retentate channel, the wall between the feed channel and the distillate channel comprising a condenser surface in the form of a non-permeable heat conducting separation wall, and the wall between the retentate channel and the distillate channel comprising a permeable non-porous selective membrane. The five distribution chambers are illustrated in FIGS. 1A and 1B and can for example be attributed as follows: 1) cold feed in; 2) warm feed out; 3) hot feed in; 4) retentate out; and 5) distillate out.

Optionally, a sixth distribution chamber may be located at the top of the module which may be used to distribute a sweep gas, presenting access to the space between the selective non-porous membrane and the heat conducting non-permeable wall.

The apparatus according to the invention may comprise more than one module, operated in parallel. The feed stream is split up into multiple feed streams and divided over the modules.

Figure 3:
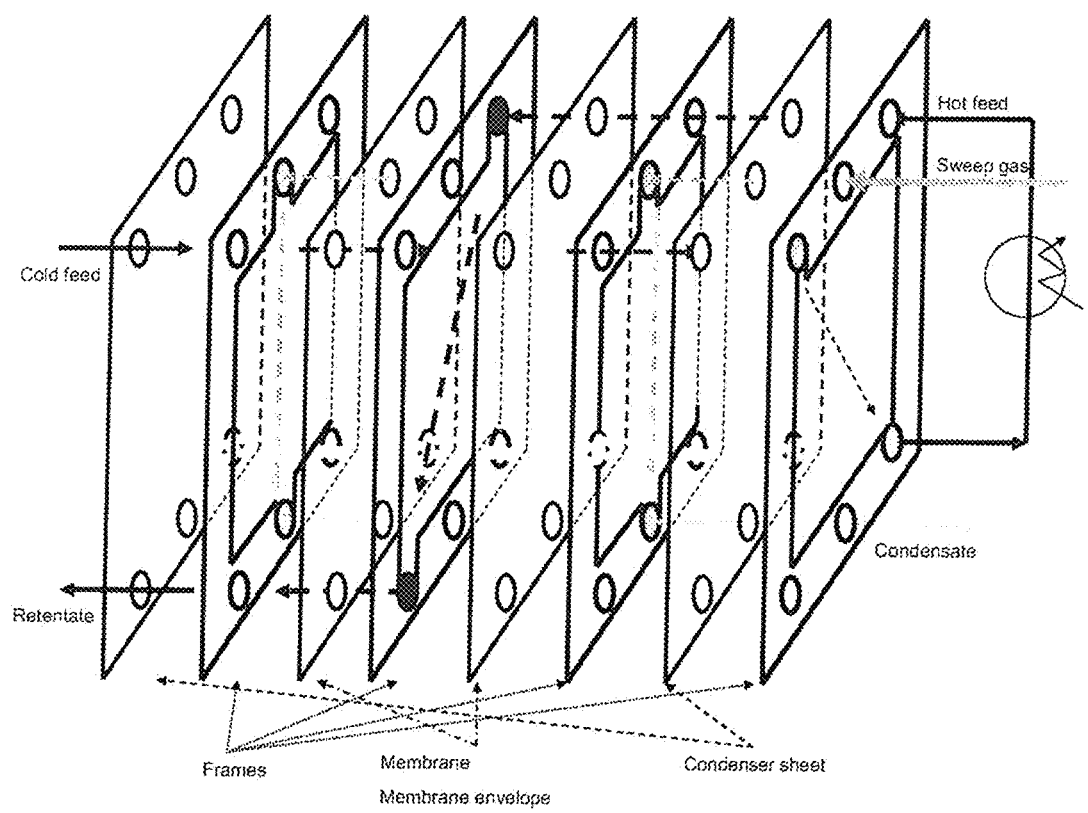
FIG. 3 illustrates units included in an apparatus used in accordance with the Invention.

In a preferred embodiment, the apparatus according to the invention comprises one or more modules comprising eight units (see FIG. 3), being four frames, two condenser sheets and two membrane envelopes (comprising a non-porous selective membrane). Each unit has a number of openings, so that when the frames are connected, channels are formed through which the feed stream (cold feed), vaporizing stream (hot feed), distillate stream (condensate), retentate stream (retentate) and, optionally, a sweep gas can be led (see FIG. 3). A first frames is connected on both sides with the two membrane envelopes, thus providing the retentate channel. Each membrane envelope is on the other side (i.e. the side not connected with the first frame) connected with a frame and a condenser sheet, thus providing two distillate channels. One of the two condenser sheets is further connected with the last frame.

The present invention will be further illustrated by the following example.

EXAMPLE

Two experiments were carried with a liquid mixture of butanol and water. The membrane used was selective for water (i.e. the membrane lets water vapor through), but not for butanol.

The first experiment was conducted using a high mass transfer (1). This means the temperature difference is high resulting in a high driving force. The second experiment is using a low mass transfer (2), which means the temperature difference is lower, resulting in a lower driving force. The temperature difference was smaller in the second experiment, but the water content was lower in experiment two. Both these factors decrease the driving force, which results in a lower separation factor, a lower flux and thus a lower heat recovery.

In both cases a pervaporate is obtained that contains less than 7% in volume of butanol.

The table below shows a summary of the results. Herein, the separation factor is defined as the ratio of water and butanol molecules that have passed through the selective membrane. A separation factor of 60 means that the selective membrane will have let through 60 times as much water molecules as butanol molecules.

TABLE 1

Results summary with butanol dewatering

|  | 1 | 2 |
| --- | --- | --- |
| Energy efficiency | 19% | 14% |
| Flux [kg/m$^2$/h] | 0.555 | 0.24 |
| ΔT [° C.] | 60 | 44 |
| Separation Factor [—] | 60 | 40 |
| Water conc. [vol %] | 31% | 25% |

The invention claimed is:

1. Process for separating a feed stream of a liquid mixture comprising at least a first liquid compound and a second liquid compound, comprising:
passing a liquid stream of the liquid mixture over a permeable non-porous selective membrane, said membrane being selective for said first liquid compound by having a permeability for vapor of said first liquid compound that is higher than the permeability of the membrane for vapor of said second liquid compound, whereby at least part of the liquid stream passes through said membrane leaving the other side of said membrane as a vapor, with the remainder of the liquid stream forming a retentate stream, and
condensing said vapor on a condenser surface having a lower temperature than the liquid stream to give a distillate stream, said condenser surface forming a non-permeable heat conducting separation wall between said distillate stream and a cooling stream; wherein the cooling stream is
a) said feed stream, in case the feed stream has a sufficiently low temperature to serve as a suitable cooling medium for the condensation of the vapor, or
b) said retentate stream, in case the feed stream has such a high temperature that would make it unsuitable as a cooling medium for the condensation of the vapor, so that heat can be transferred between the vapor and the cooling stream,
wherein a distance between said membrane and said condenser surface is smaller than 10 mm,
wherein the vapor pressure of said distillate stream is lower than the vapor pressure of the compounds in the liquid stream for which the permeable non-porous selective membrane is selective, resulting in sufficient driving force for the separation to occur,
wherein the distillate stream has a concentration of the first compound that is higher than the concentration of the first compound in the feed stream,
wherein at least part of the liquid stream passes said non-porous selective membrane with a flux in the range of 0.5-5 $kgm^{-2}h^{-1}$, and
wherein a difference in vapor pressure between the distillate stream and the liquid stream is in the range of 15-200 kPa.

2. Process according to claim 1, wherein at least part of the liquid stream passes said non-porous selective membrane with a flux in the range of 1-5 $kgm^{-2}h^{-1}$.

3. Process according to claim 1, wherein the distance between the permeable non-porous selective membrane and the condenser surface is 1-10 mm.

4. Process according to claim 1, wherein a spacer is present between the membrane and the condenser surface.

5. Process according to claim 1, wherein the permeable non-porous selective membrane is chosen from a group consisting of polymeric membranes, ceramic membranes, supported liquid membranes, and mixed matrix membranes.

6. Process according to claim 1, wherein the condenser surface is 0.1-2 times the surface area of the permeable non-porous selective membrane.

7. Process according to claim 6, wherein said non-porous selective membrane is a hollow-fiber membrane, and wherein said condenser surface is a surface of condenser tubes within said hollow-fiber membrane.

8. Process according to claim 1, wherein said feed stream flows in countercurrent, co-current or crosscurrent to said retentate stream.

9. Process according to claim 1, wherein the permeable non-porous selective membrane comprises a selective top layer having a thickness of 0.1-100 μm, wherein the selectivity of the top layer is for liquid compounds.

10. Process according to claim 1, wherein said first compound is hydrophilic and said second compound is hydrophobic.

11. Process according to claim 1, wherein said liquid mixture comprises water and an organic compound.

12. Process according claim 11, wherein said organic compound is selected from a group consisting of ethanol, butanol, ethylene glycol, glycerol and acetone.

13. Process according to claim 1, wherein the liquid mixture is a fermentation broth.

14. Process according to claim 1, wherein at least part of the liquid stream passes said non-porous selective membrane with a flux of 1 $kgm^{-2}h^{-1}$ or more.

15. Process according to claim 1, wherein the distance between the permeable non-porous selective membrane and the condenser surface is 2-4 mm.

16. Process according to claim 1, wherein the difference in vapor pressure between said distillate stream and said vaporizing retentate stream is 15-100 kPa.

17. Process according to claim 1, wherein the permeable non-porous selective membrane comprises a selective top layer having a thickness of 0.1-10 μm.

18. Process according to claim 1, wherein the permeable non-porous selective membrane comprises a selective top layer having a thickness of 0.1-1 μm.

19. Process according to claim 13, wherein said fermentation broth comprises a member of a group consisting of ethanol, acetone, butanol and mixtures thereof.

20. Process according to claim 1, wherein the cooling stream is
a) said feed stream, when the feed stream has a sufficiently low temperature to serve as a cooling medium for the condensation of the vapor.

21. Process according to claim 1, wherein the liquid mixture compounds are azeotropic and are separated beyond an azeotropic ratio.

22. Process according to claim 1, wherein the non-porous selective membrane has a separation factor of 2 to 40.

23. Process according to claim 1, wherein an enthalpy of condensation of the permeate is in the rage of 1500-2250 $kJ \cdot kg^{-1}$.

24. Process according to claim 23, wherein the enthalpy of condensation of the permeate is in the rage of 2100-2250 $kJ \cdot kg^{-1}$.

25. Process according to claim 1, wherein the difference in vapor pressure between the distillate stream and the liquid stream is in the range of 20-100 kPa.

26. Process according to claim 1, wherein the difference in vapor pressure between the distillate stream and the liquid stream is in the range of 25-100 kPa.

27. Process according to claim 1, wherein the difference in vapor pressure between the distillate stream and the liquid stream is in the range of 50-100 kPa.

* * * * *